United States Patent
Lee

(10) Patent No.: US 10,442,308 B2
(45) Date of Patent: Oct. 15, 2019

(54) DEVICE AND METHOD FOR CONTROLLING BATTERY COOLING, AND VEHICLE SYSTEM

(71) Applicants: HYUNDAI MOTOR COMPANY, Seoul (KR); KIA MOTORS CORPORATION, Seoul (KR)

(72) Inventor: Jung Hyun Lee, Yongin-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 102 days.

(21) Appl. No.: 15/706,196

(22) Filed: Sep. 15, 2017

(65) Prior Publication Data

US 2018/0312076 A1 Nov. 1, 2018

(30) Foreign Application Priority Data

Apr. 28, 2017 (KR) .......................... 10-2017-054967

(51) Int. Cl.
*B60L 11/18* (2006.01)
*H01M 10/613* (2014.01)
(Continued)

(52) U.S. Cl.
CPC .......... *B60L 11/1874* (2013.01); *B60L 58/26* (2019.02); *H01M 10/484* (2013.01); *H01M 10/486* (2013.01); *H01M 10/613* (2015.04); *H01M 10/625* (2015.04); *H01M 10/633* (2015.04); *H01M 10/6563* (2015.04); *B60L 2240/12* (2013.01); *B60L 2240/36* (2013.01); *B60L 2240/545* (2013.01); *H01M 2220/20* (2013.01)

(58) Field of Classification Search
CPC ... B60L 11/1874; B60L 58/26; H01M 10/613; H01M 10/625; H01M 10/633; H01M 10/6563; H01M 10/484
See application file for complete search history.

(56) References Cited

U.S. PATENT DOCUMENTS 5,937,664 A * 8/1999 Matsuno ............ B60H 1/00278
62/259.2
7,348,741 B2 * 3/2008 Minekawa .............. B60L 50/66
318/268

(Continued)

FOREIGN PATENT DOCUMENTS

| JP | 2005-176545 A | 6/2005 |
|---|---|---|
| JP | 5999320 B2 | 9/2016 |
| JP | 2016-199153 A | 12/2016 |

*Primary Examiner* — Behrang Badii
*Assistant Examiner* — Daniel L Greene
(74) *Attorney, Agent, or Firm* — Morgan, Lewis & Bockius LLP

(57) ABSTRACT

A battery cooling control device includes a controller that monitors temperature information of a battery, monitors vehicle speed information of a vehicle, determines an operating mode of the vehicle on the basis of the vehicle speed information and generates control information of a cooling fan by determining a control condition of the cooling fan that has been set to correspond to the operating mode of the vehicle, based on the temperature information of the battery and the vehicle speed information, and controls cooling of the battery by outputting, to the cooling fan, a control signal corresponding to the control information of the cooling fan.

21 Claims, 8 Drawing Sheets

(51) Int. Cl.
  *H01M 10/625*     (2014.01)
  *H01M 10/633*     (2014.01)
  *H01M 10/48*      (2006.01)
  *H01M 10/6563*    (2014.01)
  *B60L 58/26*      (2019.01)

(56) References Cited

U.S. PATENT DOCUMENTS

| | | | | |
|---|---|---|---|---|
| 8,994,339 | B1* | 3/2015 | Kam | H02J 7/0029 |
| | | | | 320/150 |
| 9,583,801 | B2* | 2/2017 | Steinmeyer | H01M 10/625 |
| 9,979,056 | B2* | 5/2018 | Maguire | H01M 10/613 |
| 9,985,325 | B2* | 5/2018 | Maguire | H01M 10/6563 |
| 2004/0069546 | A1* | 4/2004 | Lou | B60K 6/22 |
| | | | | 180/65.21 |
| 2009/0133859 | A1* | 5/2009 | Suzuki | B60H 1/00278 |
| | | | | 165/121 |
| 2010/0241308 | A1* | 9/2010 | Kikuchi | B60H 1/00278 |
| | | | | 701/36 |
| 2010/0323261 | A1* | 12/2010 | Igarashi | H01M 8/04029 |
| | | | | 429/436 |
| 2013/0268151 | A1 | 10/2013 | Bito | |
| 2013/0327077 | A1* | 12/2013 | Motsenbocker | H02J 1/00 |
| | | | | 62/324.1 |
| 2014/0311704 | A1* | 10/2014 | Yokoyama | H02K 9/19 |
| | | | | 165/41 |
| 2015/0270587 | A1* | 9/2015 | Cho | H01M 10/63 |
| | | | | 701/22 |
| 2016/0204478 | A1* | 7/2016 | Iguchi | H01M 10/6563 |
| | | | | 429/62 |
| 2017/0305292 | A1* | 10/2017 | Minamiura | B60L 3/0046 |

\* cited by examiner

DEVICE AND METHOD FOR CONTROLLING BATTERY COOLING, AND VEHICLE SYSTEM

CROSS-REFERENCE TO RELATED APPLICATION

This application is based on and claims the benefit of priority to Korean Patent Application No. 10-2017-0054967, filed on Apr. 28, 2017, with the Korean Intellectual Property Office, the disclosure of which is incorporated herein in its entirety by reference.

TECHNICAL FIELD

The present disclosure relates to a device and method for controlling battery cooling, and to a vehicle system.

BACKGROUND

Hybrid electric vehicles or electric vehicles are configured such that an appropriate voltage is supplied to an electric motor from a battery having a plurality of battery modules connected together in series or parallel.

As the battery is repeatedly charged and discharged, the temperature of the battery rises due to its internal resistance. Since the temperature rise of the battery has a significant influence on the performance and durability of the battery, the battery is maintained at a constant temperature by controlling an operation of a cooling fan.

An operating stage of the cooling fan is controlled on the basis of the temperature of inlet air to the battery and the maximum temperature of the battery modules. However, a sensor for measuring the inlet temperature has to be separately provided, which causes an increase in cost.

Furthermore, a separate evaluation process has to be conducted to examine the consistency of the sensing position of the inlet temperature sensor.

SUMMARY

The present disclosure has been made to solve the above-mentioned problems occurring in the related art while advantages achieved by the related art are maintained intact.

An aspect of the present disclosure provides a battery cooling control device and method and a vehicle system that control cooling of a high-voltage battery without consideration of an inlet temperature sensed by an inlet temperature sensor.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, a battery cooling control device may include a processor configured to monitor temperature information of a battery, monitor vehicle speed information of a vehicle, determine an operating mode of the vehicle on the basis of the vehicle speed information and generate control information of a cooling fan by determining a control condition of the cooling fan that has been set to correspond to the operating mode of the vehicle, based on the temperature information of the battery and the vehicle speed information, and control cooling of the battery by outputting, to the cooling fan, a control signal corresponding to the control information of the cooling fan.

According to another aspect of the present disclosure, a battery cooling control method may include monitoring temperature information of a battery and vehicle speed information of a vehicle, determining an operating mode of the vehicle on the basis of the vehicle speed information, generating control information of a cooling fan by determining a control condition of the cooling fan that has been set to correspond to the operating mode of the vehicle, based on the temperature information of the battery and the vehicle speed information, and controlling cooling of the battery by outputting, to the cooling fan, a control signal corresponding to the control information of the cooling fan.

According to another aspect of the present disclosure, a vehicle system may include a battery that supplies a driving voltage to a vehicle, a cooling fan that cools the battery by operating a motor, a vehicle speed sensor that generates vehicle speed information of the vehicle, and a battery cooling control device that determines an operating mode of the vehicle on the basis of the vehicle speed information, generates control information of the cooling fan by determining a control condition of the cooling fan that has been set to correspond to the operating mode of the vehicle, based on temperature information of the battery and the vehicle speed information, and controls cooling of the battery by outputting, to the cooling fan, a control signal corresponding to the generated control information of the cooling fan.

According to the present disclosure, it is possible to control cooling of a high-voltage battery without consideration of an inlet temperature sensed by an inlet temperature sensor, thereby saving the cost of the inlet temperature sensor.

Furthermore, according to the present disclosure, by removing an inlet temperature sensor, it is possible to omit an evaluation process for examining the consistency of the sensing position of an inlet temperature sensor, thereby reducing development time.

BRIEF DESCRIPTION OF THE DRAWINGS

The above and other objects, features, and advantages of the present disclosure will be more apparent from the following detailed description taken in conjunction with the accompanying drawings.

DETAILED DESCRIPTION

Figure 1:
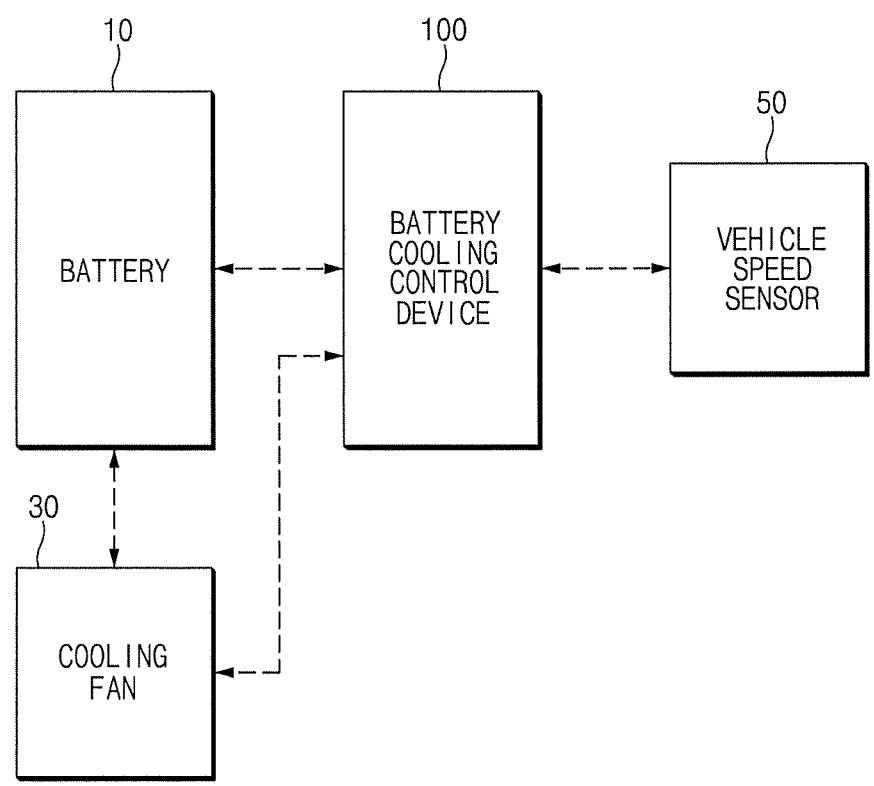
FIG. 1 illustrates a vehicle system having a battery cooling control device applied thereto, according to an embodiment of the present disclosure.

Hereinafter, exemplary embodiments of the present disclosure will be described in detail with reference to the accompanying drawings. In the drawings, the same reference numbers will be used throughout to designate the same or equivalent elements. In addition, a detailed description of well-known features or functions will be ruled out in order not to unnecessarily obscure the gist of the present disclosure.

Terms, such as "first", "second", "A", "B", "(a)", "(b)", and the like, may be used herein to describe elements of the present disclosure. Such terms are only used to distinguish one element from another element, and the substance, sequence, order, or number of these elements is not limited by these terms. Unless otherwise defined, all terms used herein, including technical and scientific terms, have the same meaning as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

FIG. 1 illustrates a vehicle system having a battery cooling control device applied thereto, according to an embodiment of the present disclosure.

The vehicle system of the present disclosure may be applied to any types of vehicles (such as an electric vehicle (EV), a hybrid electric vehicle (HEV), a plug-in hybrid electric vehicle (PHEV), a fuel cell vehicle, and the like) that include a battery and a cooling system that cools the battery through a cooling fan.

As illustrated in FIG. 1, the vehicle system according to an embodiment of the present disclosure may include a battery 10, a cooling fan 30, a vehicle speed sensor 50, and a battery cooling control device 100.

The battery 10 may be a high-voltage battery that supplies a driving voltage to a vehicle. In this case, the battery 10 may include a plurality of battery modules (not illustrated). Furthermore, the battery 10 may include a temperature sensor (not illustrated) configured to measure the temperature of the battery 10. The temperature sensor may measure the temperature of the battery 10 and may provide the measured temperature to the battery cooling control device 100.

The cooling fan 30 may operate in response to a control signal of the battery cooling control device 100 and may direct cooled air toward the battery 10 to cool the battery 10.

The vehicle speed sensor 50 may measure the speed of the vehicle and may provide the measured vehicle speed to the battery cooling control device 100.

The battery cooling control device 100 may control an operation of the cooling fan 30 on the basis of a vehicle speed and a maximum battery temperature.

Here, the battery cooling control device 100 may monitor the vehicle speed and the maximum battery temperature in the state in which the vehicle has been started. In a driving mode in which the vehicle travels at a speed higher than a reference speed, the battery cooling control device 100 may control an operation of the cooling fan 30 according to a control map set based on vehicle speeds and maximum battery temperatures.

Meanwhile, in a stop mode in which the vehicle is in a stop state or travels at a speed lower than the reference speed, the battery cooling control device 100 may restrict an operating stage of the cooling fan 30 in the case where the rate of increase in the maximum battery temperature meets a set reference condition.

Of course, even when the stop mode is disabled or the vehicle is in the stop mode, the battery cooling control device 100 may control an operation of the cooling fan 30 according to the control map set based on vehicle speeds and maximum battery temperatures in the case where the rate of increase in the maximum battery temperature does not meet the set reference condition.

The battery cooling control device 100 may be implemented inside the vehicle. In this case, the battery cooling control device 100 may be integrally formed with control units inside the vehicle, or may be implemented to be a separate device and may be connected with the control units of the vehicle by separately connecting units. Furthermore, the battery cooling control device 100 may be implemented in the force of a battery management system (BMS) inside the vehicle, or may be implemented in the battery management system (BMS).

Hereinafter, a detailed configuration of the battery cooling control device 100 will be described in more detail with reference to FIG. 2.

Figure 2:
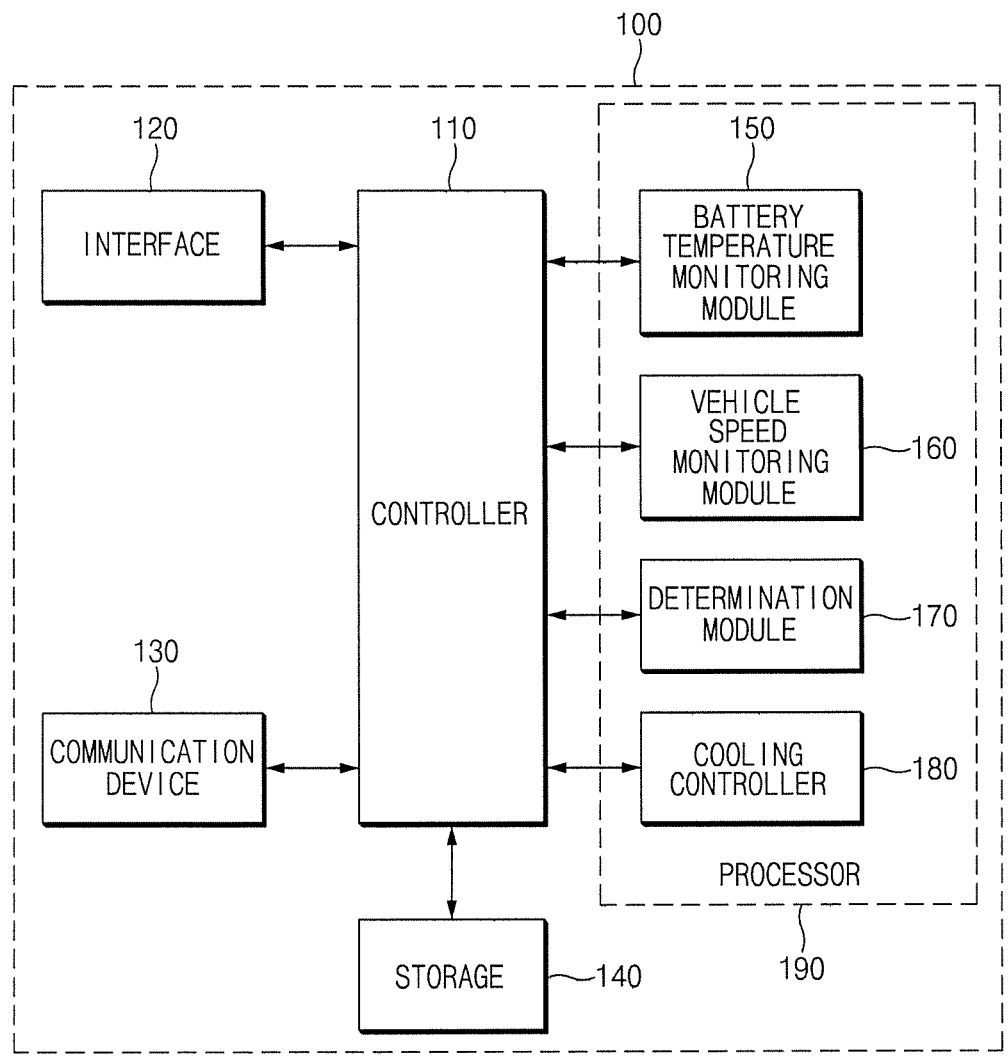
FIG. 2 illustrates a configuration of the battery cooling control device according to an embodiment of the present disclosure.

FIG. 2 illustrates a configuration of the battery cooling control device according to an embodiment of the present disclosure. Referring to FIG. 2, the battery cooling control device 100 may include a controller 110, an interface 120, a communication device 130, a storage 140, and a processor 190. The processor 190 has an associated non-transitory memory storing software instructions which, when executed by the processor 190, provides the functionalities of a battery temperature monitoring module 150, a vehicle speed monitoring module 160, a determination module 170, and a cooling controller 180. Here, the controller 110 may process signals transferred between the elements of the battery cooling control device 100, and in particular may process signals communicated between the processor 190 and the interface 120, communication device 130, and storage 140. The processor 190 may take the form of one or more processor(s) and associated memory storing program instructions, and in some examples the one or more processor(s) may be used to implement the functions of both the controller 110 and the processor 190.

The interface 120 may include an input device configured to receive a control instruction and an output device configured to output an operating state and result of the battery cooling control device 100.

The input device may include a key button and may also include a mouse, a joystick, a jog shuttle, a stylus pen, or the like. Furthermore, the input device may also include a soft key implemented on a display.

The output device may include a display and may also include a voice output device, such as a speaker. In the case where the display is provided with a touch sensor, such as a touch film, a touch sheet, a touch pad, or the like, the display may operate as a touch screen and may be implemented in a form in which an input device and an output device are integrated with each other.

The display may include at least one of a liquid crystal display (LCD), a thin film transistor liquid crystal display (TFF LCD), an organic light-emitting diode (OLED), a flexible display, a field emission display (FED), and a 3D display.

The communication device 130 may include a communication module that supports communication interface with electronic devices and/or control devices included in the vehicle. For example, the communication module may establish a communication connection with the battery 10 and the vehicle speed sensor 50 included in the vehicle to receive maximum battery temperature information and vehicle speed information. Furthermore, the communication module may establish a communication connection with the cooling fan 30 to transmit, to the cooling fan 30, a control signal for controlling an operation of the cooling fan 30.

The communication device 130 is implemented with various electronic circuits to perform various functions, for example, noise filtering, A/D conversion, encoding/decoding and modulating.

The communication device 130 may include a module that supports vehicle network communication, such as controller area network (CAN) communication, local interconnect network (LIN) communication, Flex-Ray communication, or the like.

Also, the communication device 130 may include a module for a wireless Internet connection or a module for short range communication. Here, examples of the wireless Internet technology may include a wireless LAN (WLAN), wireless broadband (Wibro), Wi-Fi, world interoperability for microwave access (Wimax), and the like, and examples of the short range communication technology may include Bluetooth, ZigBee, ultra wideband (UWB), radio frequency identification (RFID), infrared data association (IrDA), and the like.

The storage 140 may store data, algorithms, and/or the like necessary for operating the battery cooling control device 100.

The storage 140 may store maximum battery temperature information and vehicle speed information received through the communication device 130. Furthermore, the storage 140 may store a control map set based on vehicle speeds and maximum battery temperatures. Moreover, the storage 140 may store control condition information that has been set to control an operation of the cooling fan 30. Also, the storage 140 may store instructions and/or algorithms for determining whether the set control condition is satisfied and controlling an operation of the cooling fan 30 on the basis of the set control condition.

The storage 140 may include one or more storage medium/media including transitory and/or non-transitory storage media, such as a random access memory (RAM), a static random access memory (SRAM), a read-only memory (ROM), a programmable read-only memory (PROM), or an electrically erasable programmable read-only memory (EEPROM).

The battery temperature monitoring module 150 of the processor 190 may monitor the temperature of the battery 10. In this case, the battery temperature monitoring module 150 may collect temperature information of the battery 10 from the temperature sensor included in the battery 10 through the communication device 130 in real time to monitor the temperature of the battery 10.

If a battery temperature change event occurs, the battery temperature monitoring module 150 may transmit temperature change event information to the controller 110 and/or the determination module 170 of the processor 190. For example, if the rate of increase in the maximum battery temperature exceeds a reference rate (e.g., 1° C./10 min), or is lower than or equal to the reference rate, the battery temperature monitoring module 150 may transmit temperature change event information to the controller 110 and/or the determination module 170. Of course, even when no battery temperature change event occurs, the battery temperature monitoring module 150 may transmit battery temperature information to the controller 110 and/or the determination module 170 every preset period.

The vehicle speed monitoring module 160 of the processor 190 may monitor vehicle speed information. In this case, the vehicle speed monitoring module 160 may collect vehicle speed information from the vehicle speed sensor 50 included in the vehicle through the communication device 130 in real time to monitor the vehicle speed information.

If a vehicle speed change event occurs, the vehicle speed monitoring module 160 may transmit vehicle speed change event information to the controller 110 and/or the determination module 170. For example, if the vehicle speed exceeds a reference vehicle speed (e.g., 1 kph), or is lower than or equal to the reference vehicle speed, the vehicle speed monitoring module 160 may transmit vehicle speed change event information to the controller 110 and/or the determination module 170. Of course, even when no vehicle speed change event occurs, the vehicle speed monitoring module 160 may transmit vehicle speed information to the controller 110 and/or the determination module 170 every preset period.

The determination module 170 may determine an operating mode of the vehicle on the basis of vehicle speed information received from the vehicle speed monitoring module 160. If the vehicle speed exceeds the reference vehicle speed, the determination module 170 may determine the operating mode to be a driving mode. Meanwhile, if the vehicle speed is lower than or equal to the reference vehicle speed, the determination module 170 may determine the operating mode to be a stop mode.

If the operating mode is determined to be a driving mode, the determination module 170 may call, from the storage 140, the control map set based on vehicle speeds and maximum battery temperatures. Here, the control map may be a map in which operating stages of the cooling fan 30 are defined according to a vehicle speed change and a maximum battery temperature change. For example, the control map set based on vehicle speeds and maximum battery temperatures may be represented by Table 1 below.

TABLE 1

| Temp. [° C.] | Vehicle Speed [kph] | | | | | | |
|---|---|---|---|---|---|---|---|
| | ~10 | 10~30 | 30~35 | 35~55 | 55~60 | 60~70 | 70~ |
| ~32 | 0 | 0 | 0 | 0 | 0 | 0 | 0 |
| 32~33 | 1 | 1 | 1 | 1 | 1 | 1 | 1 |
| 33~36 | 2 | 2 | 2 | 2 | 2 | 2 | 2 |
| 36~39 | 2 | 2 | 2 | 2 | 3 | 3 | 3 |
| 39~42 | 2 | 2 | 3 | 3 | 4 | 4 | 4 |
| 42~47 | 2 | 4 | 4 | 5 | 5 | 6 | 7 |
| 47~50 | 4 | 4 | 4 | 7 | 7 | 7 | 7 |
| 50~54 | 4 | 4 | 4 | 8 | 8 | 8 | 8 |
| 54~ | 9 | 9 | 9 | 9 | 9 | 9 | 9 |

Based on the called control map, the determination module 170 may generate control information of the cooling fan 30 that corresponds to battery temperature information received from the battery temperature monitoring module 150 and vehicle speed information received from the vehicle speed monitoring module 160. Here, the generated control information of the cooling fan 30 may include information about the operating stage of the cooling fan 30.

The determination module 170 may transmit the generated control information of the cooling fan 30 to the controller 110 and/or the cooling controllers 180. The cooling controllers 180 may generate a control signal on the basis of the control information of the cooling fan 30 that has been received from the determination module 170, and may transmit the generated control signal to the cooling fan 30 through the communication device 130.

Accordingly, the cooling fan 30 may operate a motor on the basis of the control signal received from the communication device 130 to cool the battery 10. For example, if the cooling fan 30 receives a control signal corresponding to a second stage from the communication device 130, the cooling fan 30 may operate the motor at the second stage.

If the operating mode is determined to be a stop mode, the determination module 170 may generate control information of the cooling fan 30 on the basis of temperature change event information or battery temperature information of the battery 10 that has been received from the battery temperature monitoring module 150.

If it is determined that the rate of increase in the maximum battery temperature exceeds the reference rate, the determination module 170 may restrict the operating stage of the cooling fan 30 to a first stage. Accordingly, the determination module 170 may generate control information of the cooling fan 30 that corresponds to the first stage.

Meanwhile, if it is determined that the rate of increase in the maximum battery temperature is lower than or equal to the reference rate, the determination module 170 may call, from the storage 140, the control map (see Table 1) set based on vehicle speeds and maximum battery temperatures and may generate control information of the cooling fan 30 that corresponds to battery temperature information received from the battery temperature monitoring module 150 and vehicle speed information received from the vehicle speed monitoring devices 160, based on the called control map.

The determination module 170 may transmit the generated control information of the cooling fan 30 to the controller 110 and/or the cooling controller 180. The cooling control device 180 may generate a control signal on the basis of the control information of the cooling fan 30 that has been received from the determination devices 170 and may transmit the generated control signal to the cooling fan 30 through the communication device 130.

Accordingly, the cooling fan 30 may operate the motor on the basis of the control signal received from the communication device 130 to cool the battery 10. For example, if the cooling fan 30 receives a control signal corresponding to the first stage from the communication device 130, the cooling fan 30 may operate the motor at the first stage.

Meanwhile, if a temperature change event and/or a vehicle speed change event of the battery 10 occurs while the cooling fan 30 is being controlled based on the driving or stop mode, the determination module 170 may generate control information of the cooling fan 30 again on the basis of the occurring event.

FIGS. 3A to 3D illustrate embodiments referred to in a description of an operation of the battery cooling control device according to an embodiment of the present disclosure. The embodiments are provided to explain a difference in the battery cooling effect between the battery cooling control device according to this embodiment and a battery cooling control system in the related art.

Figure 3A:
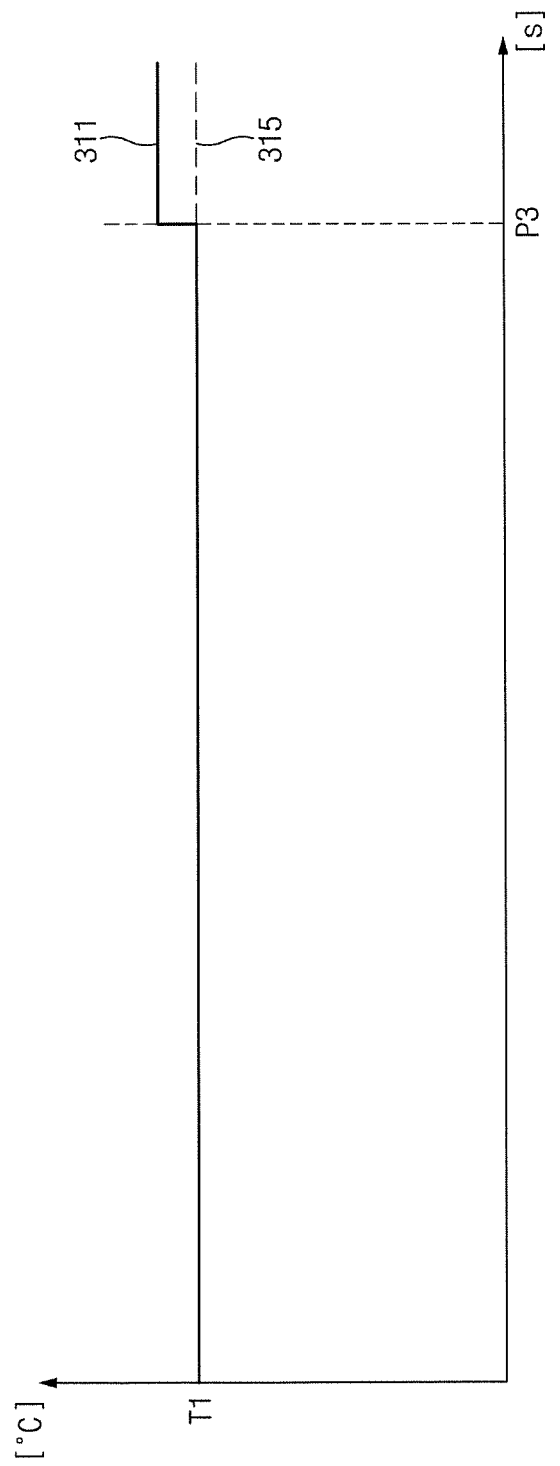
FIGS. 3A to 3D illustrate embodiments referred to in a description of an operation of the battery cooling control device according to an embodiment of the present disclosure.
Figure 3B:
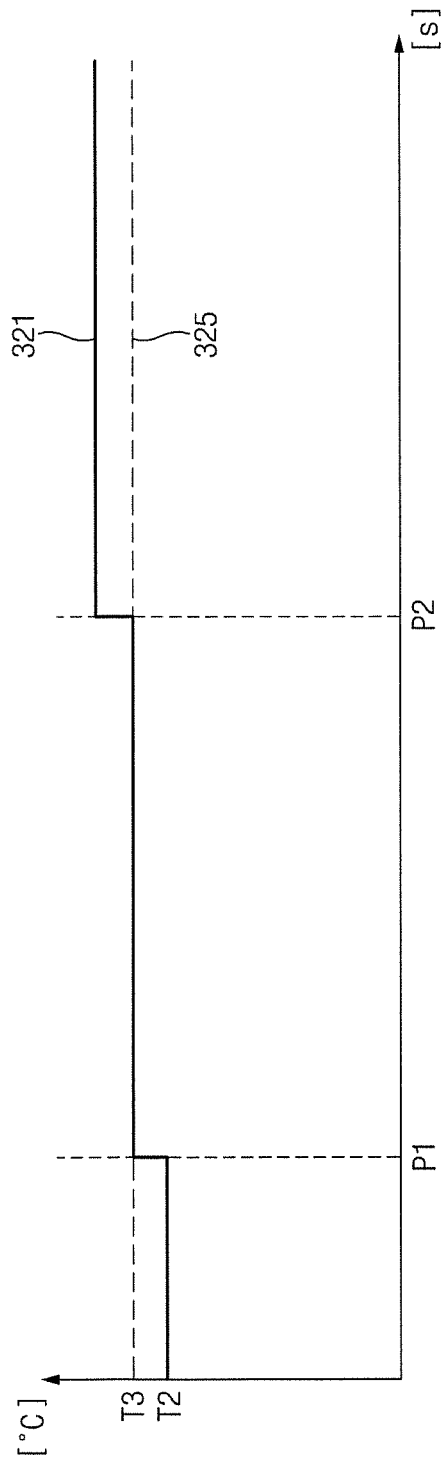
Figure 3C:
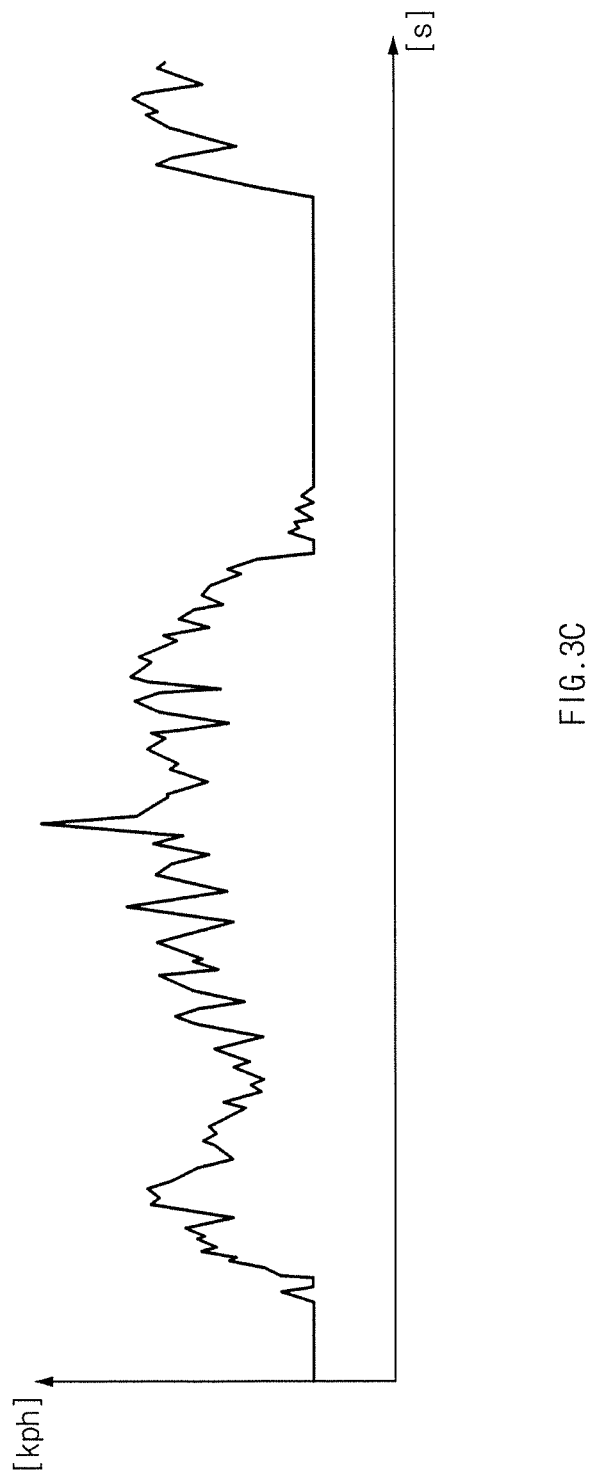
Figure 3D:
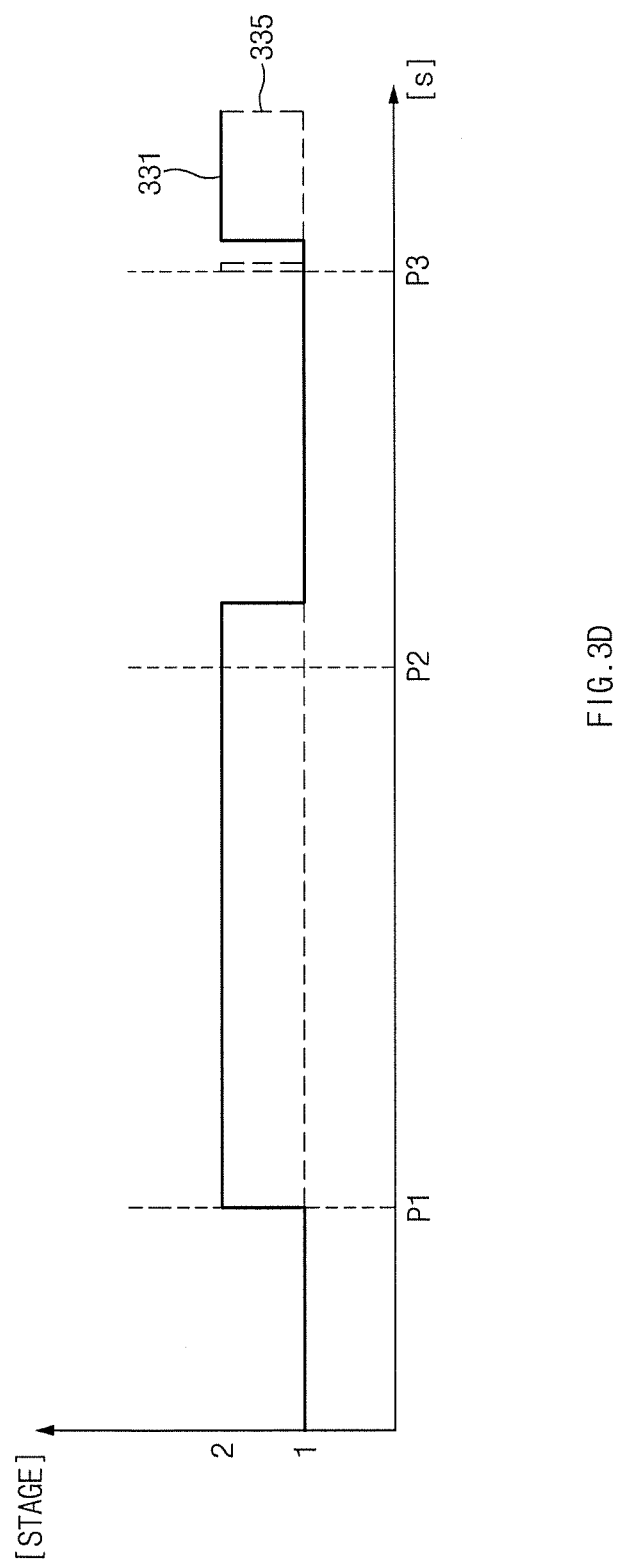

FIG. 3A is a view illustrating a cooling fan control operation based on an inlet temperature and a battery temperature in the related art, and FIG. 3D is a view illustrating an operating stage control operation for a cooling fan according to the related art and an operating stage control operation for a cooling fan according to the present disclosure.

Referring to FIGS. 3A and 3D, reference numeral 311 in FIG. 3A denotes a maximum battery temperature, reference numeral 315 in FIG. 3A denotes an inlet temperature, and reference numeral 335 in FIG. 3D denotes an operating stage of the cooling fan according to the related art. The battery cooling control system in the related art restricts the operating stage of the cooling fan to a first stage in the case where the maximum battery temperature 311 is lower than or equal to the inlet temperature 315 of T1 (e.g., 38° C.).

Accordingly, the cooling fan is controlled at the first stage over the time interval from 0 to P3 that the maximum battery temperature 311 is lower than or equal to the inlet temperature 315.

FIG. 3B is a view illustrating a battery temperature change caused by the cooling fan control operation according to the present disclosure. FIG. 3C is a view illustrating a vehicle speed change. FIG. 3D is a view illustrating an operating stage control operation for a cooling fan according to the related art and an operating stage control operation for a cooling fan according to the present disclosure.

Referring to FIGS. 3B, 3C, and 3D, reference numeral 321 in FIG. 3B denotes a maximum battery temperature, reference numeral 325 in FIG. 3B denotes an inlet temperature, and reference numeral 331 in FIG. 3D denotes an operating stage of the cooling fan according to the present disclosure. It can be seen that within the period of time between 0 and P2 in which the maximum battery temperature 321 is equal to the inlet temperature 325 of T3 (e.g., 33° C.) or a temperature of T2 (e.g., 32° C.) lower than T3 which is the inlet temperature 325, the battery cooling control device 100 according to an embodiment of the present disclosure may operate the cooling fan early at a second stage only over the time interval from P1 to P2 during which the vehicle speed increases.

Since a change in the maximum battery temperature 321 within the period of time between 0 and P2 is less than or equal to 1° C., it can be seen that the battery cooling control device 100 according to the present disclosure may control battery cooling even without an inlet temperature sensor, similarly to the battery cooling control system in the related art that controls battery cooling on the basis of an inlet temperature.

The controller 110, the battery temperature monitoring module 150, the vehicle speed monitoring module 160, the determination module 170, and the cooling controller 180 of the battery cooling control device 100 according to this embodiment, which operate as described above, may be implemented in the form of an independent hardware device and may be included, as a processor, in other hardware device(s), such as a microprocessor or a general-purpose computer system.

An operation of the above-configured battery cooling control device according to the present disclosure will hereinafter be described in more detail.

Figure 4:
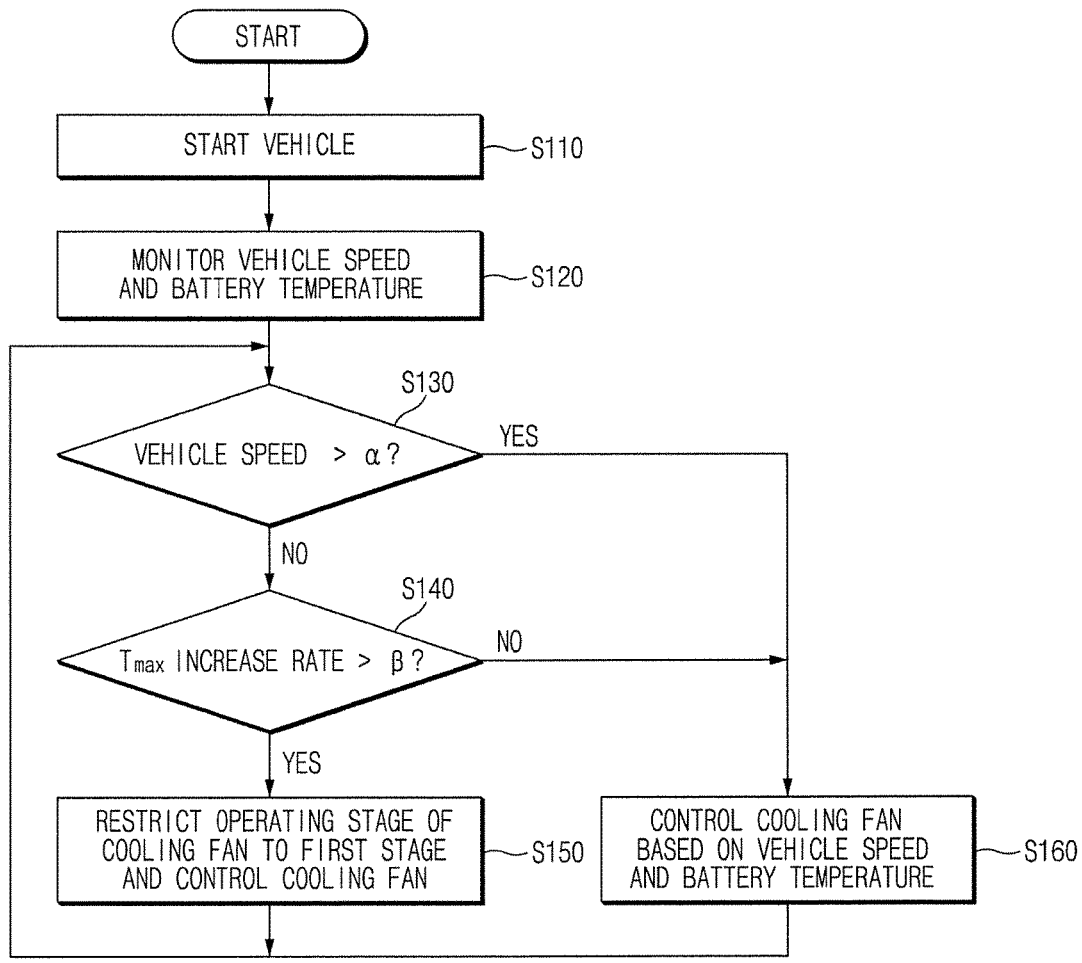
FIG. 4 is a flowchart illustrating a battery cooling control method according to an embodiment of the present disclosure.

FIG. 4 is a flowchart illustrating a battery cooling control method according to an embodiment of the present disclosure.

Referring to FIG. 4, when a vehicle starts, the battery cooling control device 100 according to the present disclosure may monitor a vehicle speed and a battery temperature (Steps S110 and S120). In this case, the battery cooling control device 100 may monitor a vehicle speed change and a battery temperature change.

In the case where the monitoring result in step S120 shows that the vehicle speed exceeds a reference vehicle speed α (Step S130), the battery cooling control device 100 may determine an operating mode of the vehicle to be a driving mode. The battery cooling control device 100 may control an operation of the cooling fan 30 on the basis of vehicle speed information and maximum battery temperature information of the vehicle (Step S160). In step S160, the battery cooling control device 100 may call the control map (see Table 1) set based on vehicle speeds and maximum battery temperatures, may generate control information of the cooling fan 30 that corresponds to the vehicle speed information and the maximum battery temperature information of the vehicle, based on the called control map, and may control the cooling fan 30 depending on the generated control information.

Meanwhile, in the case where the monitoring result in step S120 shows that the vehicle speed is lower than or equal to the reference vehicle speed α (Step S130), the battery cooling control device 100 may determine an operating mode of the vehicle to be a stop mode. The battery cooling control device 100 may check the rate of increase in the maximum battery temperature Tmax, and if it is determined that the rate of increase in the maximum battery temperature Tmax exceeds a reference rate β (Step S140), the battery cooling control device 100 may restrict the operating stage of the cooling fan 30 to a first stage to control the cooling fan 30 (Step S150).

While controlling the cooling fan 30 with the operating stage restricted to the first stage, the battery cooling control device 100 may repeat steps S130 to S150 and may monitor whether the vehicle speed and the rate of increase in the maximum battery temperature vary.

If the determination result in step S140 shows that the rate of increase in the maximum battery temperature Tmax does not exceed the reference rate β, the battery cooling control device 100 may control an operation of the cooling fan 30 on the basis of the vehicle speed information and the maximum battery temperature information of the vehicle (Step S160).

Figure 5:
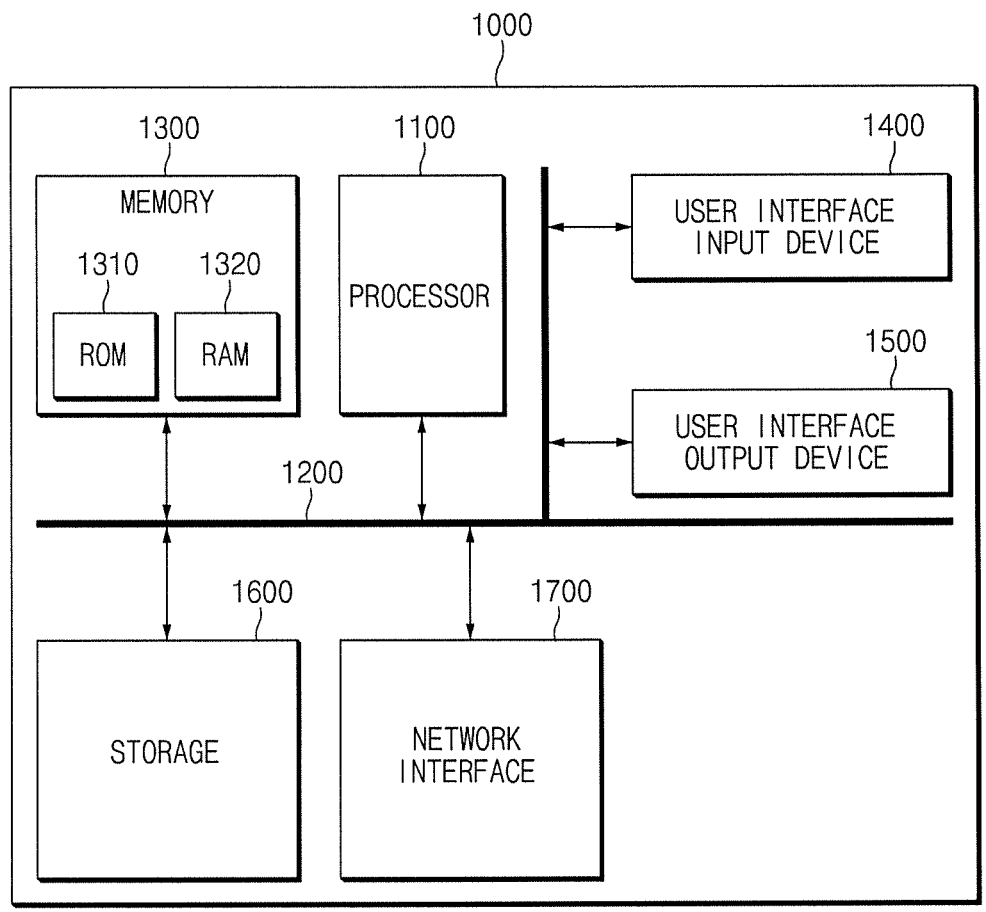
FIG. 5 illustrates a computing system in which a method according to an embodiment of the present disclosure is executed.

FIG. 5 illustrates a computing system in which a method according to an embodiment of the present disclosure is executed.

Referring to FIG. 5, a computing system 1000 may include at least one processor 1100, a memory 1300, a user interface input device 1400, a user interface output device 1500, a storage 1600, and a network interface 1700 that are connected together through a bus 1200.

The processor 1100 may be a semiconductor device that processes instructions stored in a central processing unit (CPU) or the memory 1300 and/or the storage 1600. The memory 1300 and the storage 1600 may include various types of volatile or non-volatile storage mediums. For example, the memory 1300 may include a read only memory (ROM) and a random access memory (RAM).

Accordingly, the steps of the method or algorithm described above in relation to the embodiments disclosed in this specification may be directly implemented by a hardware module or a software module executed by the processor 1100, or a combination thereof. The software module may reside in a storage medium (i.e., the memory 1300 and/or the storage 1600), such as a RAM memory, a flash memory, a ROM memory, an EPROM memory, an EEPROM memory, a register, a hard disk, a detachable disk, or a CD-ROM. An exemplary storage medium may be coupled to the processor 1100, and the processor 1100 may read information from the storage medium and may record information in the storage medium. In a different way, the storage medium may be integrated with the processor 1100. The processor and the storage medium may reside in an application specific integrated circuit (ASIC). The ASIC may reside in a user terminal. In a different way, the processor and the storage medium may also reside in a user terminal as separate components.

Although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure.

Therefore, exemplary embodiments of the present disclosure are provided to explain the spirit and scope of the present disclosure, but not to limit them, so that the spirit and scope of the present disclosure is not limited by the embodiments. The scope of the present disclosure should be construed on the basis of the accompanying claims, and all the technical ideas within the scope equivalent to the claims should be included in the scope of the present disclosure.

What is claimed is:

1. A device for controlling battery cooling, the device comprising a processor configured to:
   monitor a temperature of a battery;
   monitor a vehicle speed of a vehicle;
   determine an operating mode of the vehicle on the basis of the vehicle speed and generate control information of a cooling fan by determining a control condition of the cooling fan that has been set to correspond to the operating mode of the vehicle, based on the temperature of the battery and the vehicle speed; and
   control cooling of the battery by outputting, to the cooling fan, a control signal corresponding to the control information of the cooling fan,
   wherein the processor determines the control condition of the cooling fan on the basis of a control map in which operating stages of the cooling fan according to a vehicle speed and a maximum battery temperature are defined, if the vehicle speed exceeds a set reference vehicle speed, and
   the processor determines the control condition of the cooling fan on the basis of a rate of increase in the maximum battery temperature, if the vehicle speed is lower than or equal to the set reference vehicle speed.

2. The device of claim 1, wherein the processor determines the operating mode of the vehicle to be a driving mode if the vehicle speed exceeds the set reference vehicle speed, and determines the operating mode of the vehicle to be a stop mode if the vehicle speed is lower than or equal to the set reference vehicle speed.

3. The device of claim 2, wherein if the operating mode is determined to be the driving mode, the processor determines the control condition of the cooling fan on the basis of a control map in which operating stages of the cooling fan according to a vehicle speed and a maximum battery temperature are defined.

4. The device of claim 3, wherein the processor generates the control information of the cooling fan that corresponds to the vehicle speed and the maximum battery temperature, based on the control map.

5. The device of claim 2, wherein if the operating mode is determined to be the stop mode, the processor determines the control condition of the cooling fan on the basis of a rate of increase in the maximum battery temperature.

6. The device of claim 5, wherein if the rate of increase in the maximum battery temperature exceeds a set reference rate, the processor generates the control information of the cooling fan that restricts an operating stage of the cooling fan to a set operating stage.

7. The device of claim 6, wherein the processor updates the control information of the cooling fan if the rate of increase in the maximum battery temperature is lower than or equal to the set reference rate or the vehicle speed exceeds the set reference vehicle speed while the operating stage of the cooling fan is restricted to the set operating stage.

8. The device of claim 5, wherein if the rate of increase in the maximum battery temperature is lower than or equal to a set reference rate, the processor determines the control condition of the cooling fan on the basis of a control map in which operating stages of the cooling fan according to a vehicle speed and a maximum battery temperature are defined.

9. The device of claim 8, wherein the processor generates the control information of the cooling fan that corresponds to the vehicle speed and the maximum battery temperature of the battery, based on the control map.

10. A method for controlling battery cooling, the method comprising:
monitoring, by a processor, a temperature of a battery and a vehicle speed of a vehicle;
determining, by the processor, an operating mode of the vehicle on the basis of the vehicle speed and generating control information of a cooling fan by determining a control condition of the cooling fan that has been set to correspond to the operating mode of the vehicle, based on the temperature of the battery and the vehicle speed; and
controlling, by the processor, cooling of the battery by outputting, to the cooling fan, a control signal corresponding to the control information of the cooling fan,
wherein the processor determines the control condition of the cooling fan on the basis of a control map in which operating stages of the cooling fan according to a vehicle speed and a maximum battery temperature are defined, if the vehicle speed exceeds a set reference vehicle speed, and
the processor determines the control condition of the cooling fan on the basis of a rate of increase in the maximum battery temperature, if the vehicle speed is lower than or equal to the set reference vehicle speed.

11. The method of claim 10, wherein the generating of the control information of the cooling fan includes:
determining the operating mode of the vehicle to be a driving mode if the vehicle speed exceeds a set reference vehicle speed; and
determining the operating mode of the vehicle to be a stop mode if the vehicle speed is lower than or equal to the set reference vehicle speed.

12. The method of claim 11, wherein the generating of the control information of the cooling fan further includes:
determining the control condition of the cooling fan on the basis of a control map in which operating stages of the cooling fan according to a vehicle speed and a maximum battery temperature are defined, if the operating mode is determined to be the driving mode.

13. The method of claim 12, wherein the generating of the control information of the cooling fan further includes:
generating control information of the cooling fan that corresponds to the vehicle speed and the maximum temperature of the battery, based on the control map.

14. The method of claim 11, wherein the generating of the control information of the cooling fan further includes:
determining the control condition of the cooling fan on the basis of a rate of increase in the maximum battery temperature, if the operating mode is determined to be the stop mode.

15. The method of claim 14, wherein the generating of the control information of the cooling fan further includes:
generating control information of the cooling fan that restricts an operating stage of the cooling fan to a set operating stage, if the rate of increase in the maximum battery temperature exceeds a set reference rate.

16. The method of claim 15, wherein the generating of the control information of the cooling fan further includes:
updating the control information of the cooling fan if the rate of increase in the maximum battery temperature is lower than or equal to the set reference rate or the vehicle speed exceeds the set reference vehicle speed while the operating stage of the cooling fan is restricted to the set operating stage.

17. The method of claim 14, wherein the generating of the control information of the cooling fan further includes:
determining the control condition of the cooling fan on the basis of a control map in which operating stages of the cooling fan according to a vehicle speed and a maximum battery temperature are defined, if the rate of increase in the maximum battery temperature is lower than or equal to a set reference rate.

18. The method of claim 17, wherein the generating of the control information of the cooling fan further includes:
generating control information of the cooling fan that corresponds to the vehicle speed and the maximum battery temperature of the battery, based on the control map.

19. A vehicle system comprising:
a battery configured to supply a driving voltage to a vehicle;
a cooling fan configured to cool the battery by operating a motor;
a vehicle speed sensor configured to detect a vehicle speed of the vehicle; and
a processor configured to determine an operating mode of the vehicle on the basis of the vehicle speed, to generate control information of the cooling fan by determining a control condition of the cooling fan that has been set to correspond to the operating mode of the vehicle, based on a temperature of the battery and the vehicle speed, and to control cooling of the battery by outputting, to the cooling fan, a control signal corresponding to the generated control information of the cooling fan,
wherein the processor determines the control condition of the cooling fan on the basis of a control map in which operating stages of the cooling fan according to a vehicle speed and a maximum battery temperature are defined, if the vehicle speed exceeds a set reference vehicle speed, and
the processor determines the control condition of the cooling fan on the basis of a rate of increase in the maximum battery temperature, if the vehicle speed is lower than or equal to the set reference vehicle speed.

20. The vehicle system of claim 19, wherein the processor determines the control condition of the cooling fan on the basis of a control map in which operating stages of the cooling fan according to a vehicle speed and a maximum battery temperature are defined, if the operating mode is determined to be a driving mode; and
wherein the processor determines the control condition of the cooling fan on the basis of a rate of increase in the maximum battery temperature or on the basis of the control map, if the operating mode is determined to be a stop mode.

21. The vehicle system of claim 20, wherein the processor restricts an operating stage of the cooling fan to a set operating stage if the rate of increase in the maximum battery temperature exceeds a set reference rate.

* * * * *